United States Patent [19]

McKee et al.

[11] Patent Number: 4,922,163
[45] Date of Patent: May 1, 1990

[54] ACTIVELY COOLED BRUSH BOX ASSEMBLY

[75] Inventors: Bobby D. McKee, San Jose; Alvin H. Nakagawa, Campbell, both of Calif.

[73] Assignee: Westinghouse Electric Corp., Pittsburgh, Pa.

[21] Appl. No.: 281,138

[22] Filed: Dec. 8, 1988

[51] Int. Cl.$^5$ ............................................ H02K 13/00
[52] U.S. Cl. .................................. 310/239; 310/227; 310/52
[58] Field of Search .................. 310/52, 64, 178, 227, 310/239, 248, 252, 251

[56] References Cited

U.S. PATENT DOCUMENTS

| | | | |
|---|---|---|---|
| 3,206,630 | 9/1965 | Berger et al. | 310/227 |
| 4,582,121 | 4/1986 | Casey | 165/104.21 |
| 4,602,177 | 7/1986 | Eckels et al. | 310/178 |

Primary Examiner—Peter S. Wong
Assistant Examiner—Judson H. Jones
Attorney, Agent, or Firm—D. Schron

[57] ABSTRACT

A current collecting brush box assembly for a homopolar generator wherein the assembly includes a high electrical and thermal conductivity, low weight controlled porosity metallic foam for heat transfer and current conduction purposes as well as for direct contact with the rotor of the homopolar generator.

9 Claims, 2 Drawing Sheets

ACTIVELY COOLED BRUSH BOX ASSEMBLY

BACKGROUND OF THE INVENTION

1. Field of the Invention

The invention in general relates to dynamoelectric machines, such as homopolar generators, and more particularly, to an improved fluid cooled current collector utilized in such machine

2. Background Information

Homopolar generators find extensive use as pulse power sources operable to provide large magnitude direct currents at relatively low voltages. Very basically, the homopolar generator typically includes a stator with magnetic core and field excitation as well as a rotor in which the DC current is induced during rotation of the rotor.

Homopolar generators may be used as a pulse source in electromagnetic launchers and when so utilized, the rotor is driven to a predetermined speed at which time current collection members, known as brush box assemblies, are brought into contact with the spinning rotor for transfer of current to a storage device such as a large inductor.

Present and future applications of homopolar generators require that they operate in a steady state mode for several minutes In high current homopolar generators approximately 85% of the heat generated is generated by the brush box assembly in contact with the rotor surface. Accordingly, such arrangements require the removal of heat by active cooling of the brush box assembly.

The brush box assembly of the present invention is an improved design which allows for such active cooling and which may be fabricated by relatively simple manufacturing techniques.

SUMMARY OF THE INVENTION

A brush box assembly is provided for use in a dynamoelectric machine such as a homopolar generator and includes an electrically conducting brush box housing having top, bottom, side and end walls which define an interior with wall surfaces. A high electrical and thermal conductivity, low weight, controlled porosity metal, known as metallic foam, is disposed within the interior and is in positive bonded contact with the wall surfaces of the interior. The housing has fluid inlet and outlet ports in fluid communication with the interior and the metallic foam is disposed in the fluid path between the inlet and outlet ports so as to be in good heat transfer relationship with a fluid coolant supplied to the inlet port. A brush portion is provided at the bottom of the housing and is operable to make contact with the rotor of the dynamoelectric machine, with the brush portion being in both thermal as well as electrical contact with the metallic foam such that heat generated at the rotor surface is conducted to the metallic foam, and electrical current carried by the brush portion is conducted by the metallic foam as well as by the electrically conducting housing.

In another embodiment, a brush box assembly is provided wherein the brush portion itself is a metallic foam and heat transfer means is provided within the interior of the housing so as to be in thermal contact with the metallic foam.

BRIEF DESCRIPTION OF THE PREFERRED EMBODIMENTS

Figure 1:
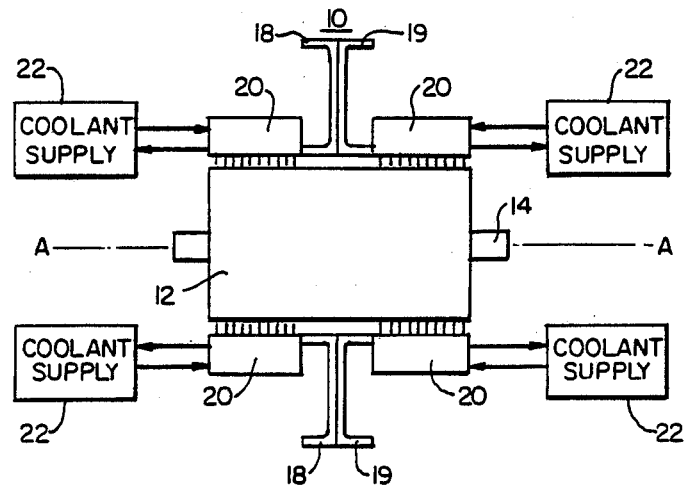
FIG. 1 is a simplified representation of a homopolar generator.

Referring now to FIG. 1, there is illustrated, in simplified presentation, a typical homopolar generator 10. The generator includes a rotor member 12 mounted for rotation about a central axis AA and driven by a prime mover (not illustrated) connected to rotor shaft 14. Although not illustrated, in order to simplify the drawing, the machine is provided with an excitation system including field coils for producing magnetic flux and a stator having main pole pieces utilized to confine the magnetic flux to a particular zone of the rotor.

As the rotor 12 rotates, it cuts lines of flux in the main flux path thereby inducing currents at the surface of the rotor which is generally designed to be more conductive than the remainder of the rotor. This current is transferred to a load circuit by means of conductors 18 and 19 when brush box assemblies 20 are lowered to make sliding electrical contact with the rotor. These brush box assemblies 20 are spaced around the machine at either end thereof and a plurality is provided so as to minimize brush current density for a given total output current. In some machines, the brush box assemblies may be in continuous contact with the rotor whereby current would be delivered at the appropriate time by means of a switching network connected to the output circuits.

In view of the high currents involved, typically hundreds of thousands to millions of amperes, active cooling is provided, particularly for the brush box assemblies with the coolant supply system being indicated by numeral 22. With such arrangement a brush box assembly 20 must be of a design so that generated heat can be transferred to the coolant and the design must be such that the assembly may be fabricated with relative ease.

Figure 2:
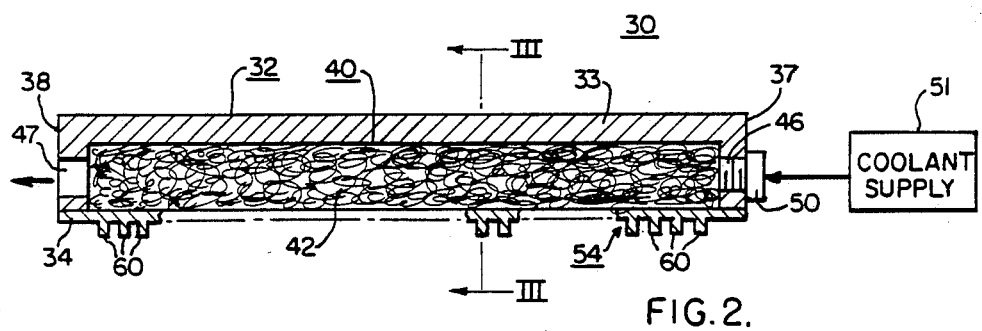
FIG. 2 is a cross-sectional view of a brush box assembly in accordance with one embodiment of the present invention.
Figure 3:
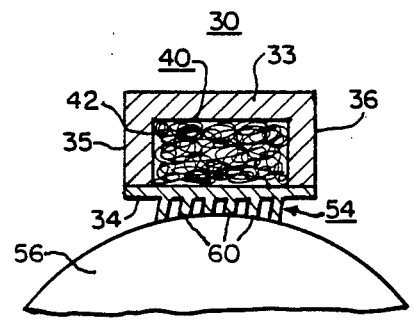
FIG. 3 is a view along line III—III of FIG. 2.

FIG. 2 illustrates in longitudinal cross-section, a brush box assembly 30 which meets the present objectives. With reference now to FIGS. 2 and 3, the brush box assembly 30 includes a housing 32 having a top 33, a bottom 34, side walls 35 and 36, and end walls 37 and 38. The walls of the housing 32 define an interior 40 which in the embodiment of FIG. 2 is filled with a high electrical and thermal conductivity low weight, controlled porosity metal which is a readily available commercial product often referred to as metallic foam. Metallic foam 42 must be and is in bonded contact with the bottom wall surface and at least one other surface of the interior and preferably with as many wall surfaces thereof as is practical. In other words, for proper operation of the brush box assembly it is not enough that the metallic foam merely be placed within the interior of the housing, but rather the metal fibers on the surface of the foam must be bonded, such as by diffusion bonding, to the metallic surface of the interior wall.

End walls 37 and 3S of the housing 32 include respective fluid inlet and outlet ports 46 and 47 and means such as a coupling or fitting 50 is operable to connect the inlet port to a fluid coolant supply 51 such that the coolant which is supplied traverses the metallic foam 42 disposed in the path between inlet and outlet port 46 and 47.

The brush box assembly includes a brush portion 54 at the bottom thereof and operable to make contact with a rotor 56 of a dynamoelectric machine such a homopolar generator. In the embodiment of FIG. 2, the brush portions 54 may be machined from a solid block constituting the bottom 34 of housing 32 with the machining process, such as may be accomplished by an electro-discharge machine, forming a plurality of individual resilient fibers 60. These fibers 60 may be typically formed at an angle such as illustrated in FIG. 3, with the bottom-most portion of the fibers being machined to a curvature to match the curvature of rotor 56.

Figure 4:
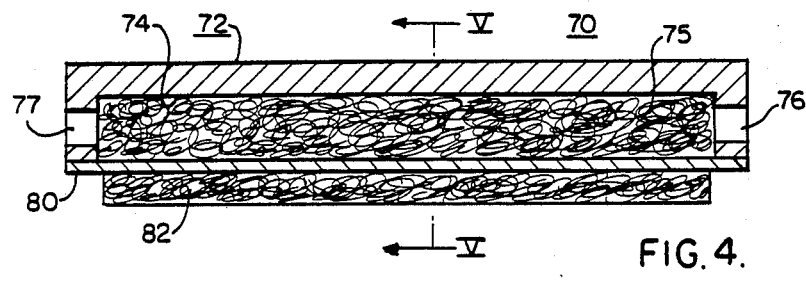
FIG. 4 is a cross-sectional view of another embodiment of the present invention.
Figure 5:
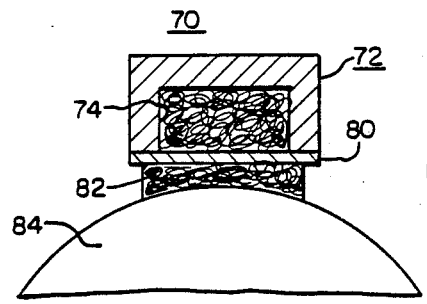
FIG. 5 is a cross-sectional view along the line V—V of FIG. 4.

FIGS. 4 and 5 illustrate a brush box assembly 70 in accordance with another aspect of the invention. The brush box assembly includes a housing 72 having an interior 74 in which is disposed a heat transfer means, one example being metallic foam 75 disposed in the fluid path between cooling fluid inlet and outlet ports 76 and 77. Attached to the bottom 80 of housing 72 is a brush portion 82 comprised of a metallic foam as previously described and being in intimate bonded contact with the bottom 80 and having a contoured surface, as illustrated in FIG. 5, machined so as to match the curvature of a rotor 84.

Figure 6:
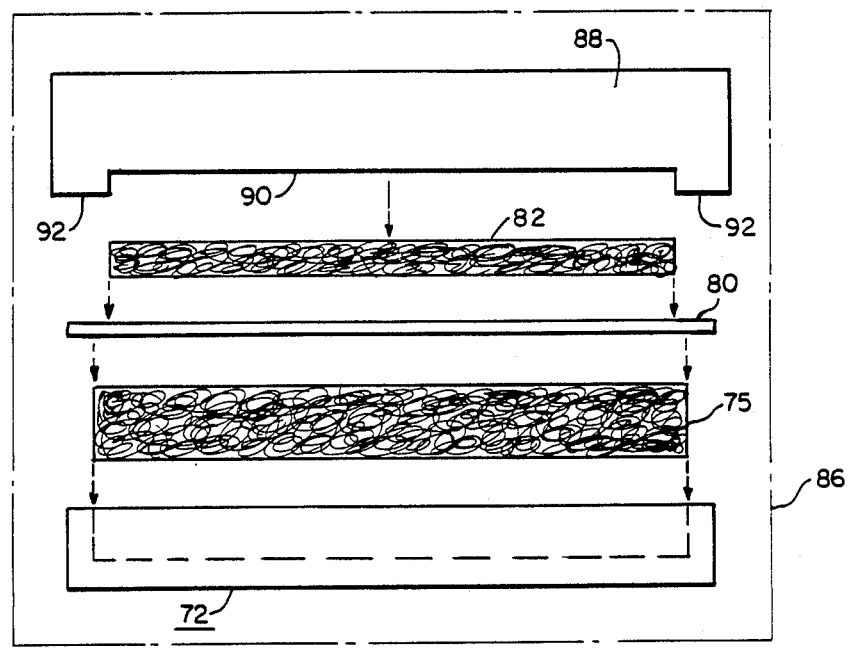
FIG. 6 is an exploded view of the brush box assembly of FIG. 4 illustrating the manufacturing thereof.

FIG. 6 serves to illustrate the fabrication of a brush box assembly such as that illustrated in FIG. 4. The housing as well as the metallic foam components which may typically be of copper, are assembled in a controlled environment 86 such as a vacuum or hydrogen atmosphere. The metallic foam 75 is somewhat oversized for the interior of housing 72 and is forced into the interior to make good contact (however not bonded contact) with the housing interior walls. FIG. 6 illustrates the assembly of the housing in an inverted position such that the bottom 80 may next be placed over the metallic foam 75 and the brush portion 82 placed in position on the bottom 80. One or more heavy weights is then placed on the assembled components such that surface 90 contact metallic foam 82 and surfaces 92 contact bottomplate 80. The controlled atmosphere may then be introduced and the temperature elevated to just below the melting point of the copper and held for a predetermined period of time which may be in the order of hours. This process results not only in a diffusion bonding of the metallic foams 75 and 82 but additionally, the bonding of the bottom 80 to the remainder of housing 72.

We claim:

1. A brush box assembly for a dynamoelectric machine having a rotor, comprising:
   (A) an electrically conducting brush box housing having a top, bottom, side and end walls defining an interior with wall surfaces;
   (B) a metallic foam disposed within said interior and in bonded contact with said wall surfaces;
   (C) said housing having fluid inlet and outlet ports in fluid communication with said interior;
   (D) said metallic foam being disposed in the fluid path between said inlet and outlet ports;
   (E) means for supplying a fluid coolant to said inlet port;
   (F) a brush portion at the bottom of said housing and operable to make contact with the rotor of said machine;
   (G) said brush portion being in both thermal and electrical contact with said metallic foam such that heat generated at the rotor surface is conducted to said metallic foam and electrical current carried by said brush portion is conducted by said metallic foam as well as by said housing.

2. Apparatus according to claim 1 wherein:
   (A) said brush portion is formed by machining said bottom of said housing to define a plurality of resilient fibers.

3. Apparatus according to claim 1 wherein:
   (A) said brush portion is a metallic foam bonded to said bottom of said housing.

4. Apparatus according to claim 1 wherein:
   (A) said brush box housing is of copper; and
   (B) said metallic foam is a copper metallic foam.

5. A brush box assembly for a dynamoelectric machine having a rotor, comprising:
   (A) an electrically conducting brush box housing; and
   (B) a metallic foam bonded to said housing and operable to make electrical contact with the rotor of said machine.

6. Apparatus according to claim 5 wherein:
   (A) said brush box housing has top, bottom and side walls defining an interior;
   (B) said housing includes fluid inlet and outlet ports in fluid communication with said interior; and which includes
   (C) means for supplying a fluid coolant to said inlet port; and
   (D) heat transfer means within said interior in thermal contact with said metallic foam.

7. Apparatus according to claim 1 wherein:
   (A) the rotor contact area of said brush portion is machined to match the curvature of said rotor.

8. Apparatus according to claim 5 wherein:
   (A) the rotor contact area of said foam is machined to match the curvature of said rotor.

9. Apparatus according to claim 1 wherein:
   (A) said fluid inlet and outlet ports are respectively disposed in opposed ones of said end walls.

* * * * *